United States Patent
Mousty et al.

(10) Patent No.: US 7,399,805 B2
(45) Date of Patent: Jul. 15, 2008

(54) ELASTOMER COMPOSITIONS BASED ON FILLED LATEX

(75) Inventors: Hervé Mousty, Domicile (FR); Marcel Tornare, Domicile (CH)

(73) Assignee: Conception Et Développement Michelin S.A. (CH)

( * ) Notice: Subject to any disclaimer, the term of this patent is extended or adjusted under 35 U.S.C. 154(b) by 458 days.

(21) Appl. No.: 10/770,968

(22) Filed: Feb. 2, 2004

(65) Prior Publication Data

US 2004/0192839 A1 Sep. 30, 2004

Related U.S. Application Data

(63) Continuation of application No. PCT/EP02/08188, filed on Jul. 23, 2002.

(30) Foreign Application Priority Data

Aug. 3, 2001 (FR) .................................. 01 10479

(51) Int. Cl.
*C08F 2/16* (2006.01)
(52) U.S. Cl. ...................................... 524/804; 523/340
(58) Field of Classification Search ................. 524/804; 523/340
See application file for complete search history.

(56) References Cited

U.S. PATENT DOCUMENTS

| | | | | |
|---|---|---|---|---|
| 5,182,322 A | * | 1/1993 | Dawes | 524/308 |
| 5,961,913 A | * | 10/1999 | Haase | 264/326 |
| 6,075,084 A | | 6/2000 | Mabry et al. | 524/495 |
| 6,413,478 B1 | * | 7/2002 | Mabry et al. | 422/187 |

FOREIGN PATENT DOCUMENTS

| | | |
|---|---|---|
| GB | 306621 | 2/1929 |
| GB | 1342001 | 12/1973 |

* cited by examiner

*Primary Examiner*—Edward J Cain
(74) *Attorney, Agent, or Firm*—Fitzpatrick, Cella, Harper & Scinto (57) ABSTRACT

A process for the production of a vulcanized elastomer composition, said process consisting in producing an aqueous dispersion containing at least latex with a small particle size and a filler having undergone a mechanical working stage and conventional vulcanization ingredients, in drying said dispersion and then vulcanizing it in a mould under pressure without subjecting said dried aqueous dispersion to mechanical working.

15 Claims, 1 Drawing Sheet

Figure 1
Key: Contrainte = Stress; Déformation = Deformation

ELASTOMER COMPOSITIONS BASED ON FILLED LATEX

BACKGROUND OF THE INVENTION

This is a continuation of international application PCT/EP02/08188, which was published in French on Feb. 20, 2003, as international publication WO 03/014208 and which claims priority of French application 01/10479 filed Aug. 3, 2001.

The present invention relates to elastomer compositions obtained by deposition and drying of an aqueous dispersion containing at least latex, a filler and conventional vulcanization ingredients, and by vulcanization under pressure.

Since the very beginning of the 20$^{th}$ century, carbon black has been the dominant filler for rubber mixtures conventionally used in the tire industry due to the outstanding reinforcing properties which it imparts to the mixtures. Such reinforcement brings about a change in the uncured and cured properties of the mixture. The presence of a filler in particular results when uncured:—in an increase in viscosity, when cured:—in an increase in resistance to any deformation,
—in a major increase in hysteresis,
—in an improvement of limit values and wear resistance.

Patent application FR 2 588 008 proposes, in order to obtain a filler-polymer composition from latex, impregnating the filler with at least one latex emulsion in such a manner as to bring about at least partial coagulation of the latex polymer by dehydration of the latex. The content of dry polymer relative to the filler varies between 25 and 100%. Silane may be added in the form of an aqueous emulsion. Masterbatches produced in said manner disperse the filler more effectively.

However, the enhanced mechanical properties of an elastomer composition obtained from elastomers and fillers processed in the solid phase in internal mixers or roll mills are generally attributed to the significant mechanical working imparted to the mixture during the production thereof The very nature of a latex makes it possible to dispense with required significant mechanical working in order to mix a filler and a latex. It would seem, however, that filler-polymer compositions which have adequate mechanical properties for use in a tire have never been obtained in this manner.

The object of the invention is to be able to gain the advantage of the reduced energy consumption associated with the production of latex-based filler-polymer compositions while obtaining the adequate mechanical properties of compositions as they are conventionally produced in the tire industry.

SUMMARY OF THE INVENTION

The present invention provides a process for the production of a vulcanized elastomer composition, said process consisting in producing an aqueous dispersion containing at least latex with a small particle size and a filler having undergone a mechanical working stage and conventional vulcanization ingredients, in drying said dispersion and then vulcanizing it in a mould under pressure without subjecting said dried aqueous dispersion, containing at least latex and said filler, to mechanical working, the aim of which would be to improve the mechanical properties of the vulcanized composition. Vulcanization is performed by curing under pressure once said composition has been introduced into a mould appropriate to the final product to be manufactured. The vulcanization pressure is greater than 15 bar, and preferably greater than 50 bar.

The filler and latex must be finely mixed in the aqueous dispersion. The final mixture contains at least 35 phr of filler, and, after drying, must not have a viscosity at 100° C. of greater than $1.2 \ 10^6$ Pa s.

Under these conditions and with latices having particle sizes of less than or equal to 115 nm, it is possible to obtain mixtures having reduced uncured viscosity, reduced moduli at slight deformation and breaking forces of greater than 20 MPa.

Furthermore, with latices having particle sizes of less than or equal to 65 nm, permanent elongation, hysteresis and abrasion resistance are similar to those obtained with a mixture formulated with the same content of filler and vulcanizing agents and produced in conventional manner in an internal mixer.

Mechanical working of the fillers may be performed alternatively on the powdered or palletized filler for example using a ball mill, or on the powdered or palletized filler in the presence of a proportion of the latex for example using a ball mill, or on the aqueous dispersion of the filler in the presence of a proportion of the latex for example using a ball mill, or on the aqueous dispersion of the filler by passing it at high pressure through small holes, for example using a homogenizer.

These methods may be used to produce latex-based mixtures having sufficiently small particles. The latices comprise those directly obtained from emulsion synthesis, namely: SBR latex, carboxylated SBR latex, nitrile latex, carboxylated nitrile latex, polychloroprene latex, acrylic latex, vinylpyridine latex. The latices may also comprise artificial latices obtained by emulsifying an organic solution of polymer, such as polyisoprene, polybutadiene, butyl rubber (isobutylene, isoprene rubber), halogenated butyl rubber, EPDM. The fillers belong to the class of reinforcing fillers. They are of conventional fineness and comprise equally well carbon black or white fillers, such as silica, alumina etc.

DETAILED DESCRIPTION OF THE INVENTION

Raw Materials Used.

| Category | Product | Note |
|---|---|---|
| NR latex | NR LA TZ | Low ammonia natural rubber latex |
| SBR latex | Intex 132 | SBR latex, 24% styrene, ML(1 + 4) = 140 |
| SBR latex | LX112 | SBR latex, 25% styrene, ML(1 + 4) = 60 |
| SBR latex | LX110 | SBR latex, 25% styrene, ML(1 + 4) = 150 |
| Carbon black | N375 | |
| Silica | Coupsil 8113 | Silica VN3 + 11% SI69 |
| Plasticiser | Aromatic oil | |
| Sulphur | 95% colloidal sulphur | |
| ZnO | Active ZnO | |
| Dispersant | Tamol NN 4501 | BASF |
| Thickener | CMC | Carboxymethylcellulose |
| Surfactant | Emulvin W | Nonionic surfactant, Bayer |
| Surfactant | Sodium dodecylbenzenesulphonate | Anionic |

Particle size measurements of the latices used were carried out by photon correlation spectroscopy (PCS) using a Zetasizer 5000 instrument (Malvern Instruments Ltd.) operating in the range 5-3000 nm.

| Latex | Particle size (nm) |
|---|---|
| LX110 | 64 |
| LX112 | 114 |
| Intex 132 | 254 |
| NR LA-TZ | 370 |

The above-stated values were determined by volume, calculation of the particle sizes being based on the refractive index of styrene. The values obtained for LX110 and LX112 are slightly greater than those stated by the manufacturer Nippon Zeon, which were measured using a method which is not stated: 50 nm for LX110 and 80 nm for LX112.

Initial Procedure and Description of Measurements.

First of all, dispersions of active products such as ZnO, CBS and sulphur were prepared separately by grinding in a ball jar. Grinding times vary from product to product, ranging from 24 to 48 hours as is well known.

A filler dispersion (carbon black or silica) with a dry solids content of approximately 25% is also produced in a ball jar in the presence of suitable surfactants, mainly Tamol. The silica used is a Degussa VN3 silica already modified with 11% of bonding agent SI69. N375 was selected as the carbon black.

The final mixture was produced as follows:
- the latex, to which Emulvin W is added to stabilize it, is stirred for 1 hour.
- once the filler is dispersed, the predispersed ingredients of the vulcanization system are added,
- the filler dispersion is gently stirred into the latex,
- stirring is continued for a few minutes,
- the final suspension, with a dry solids content of approximately 35%, is sprayed into a drying tower supplied with hot air at approximately 80° C.

Once recovered, the mixture is dried overnight in the open air and then placed in conventional manner into a piston mould.

The mixture is then cured under a pressure of 55 bars fr 10 min at 135° C., then for 20 min while raising the temperature to 165° C.

Viscosity is determined with a rubber viscoelasticity analyser (Rubber Process Analyzer—RPA2000, Alpha Technologies) at 100° C. with deformation of 14% and a frequency of 0.07 Hz. Vulcanization of the uncured sample is measured with the same apparatus under the following conditions: a temperature of 165° C., deformation of 4.2% and a frequency of 1.67 Hz. The torque required to apply a deformation of 4.2% to the sample is measured; this is the elastic portion of said torque S' which is shown in the Tables. Shear modulus G' at 0.7% deformation is measured on an outward cycle using the RPA2000 instrument at a temperature of 40° C. and a frequency of 1.67 Hz. The tangent delta value is recorded under the same conditions at 40% deformation on the return cycle. The secant moduli at 10, 100 and 300% are determined on the second traction cycle using an Instron 4466 tensile tester with a traction speed of 500 mm/min. The ME300/ME100 ratio, together with the breaking load, is taken as an index of reinforcement. Set in % corresponds to the elongation at which tensile force falls to zero on return from the second 300% traction cycle when measuring the 300% secant modulus. The test specimen used is of a constant width of 5 mm, a thickness of approximately 3 mm and a length between jaws of 90 mm. Breaking properties are measured using the same tensile tester at a speed of 500 mm/min. In this case, the test specimen is similar to the H1 dumbbell type described in French standard NF T 46-002 of a total length of 127 mm, a width of the heads of 23 mm, a length of the straight part of 25 mm, a width of the straight part of 3.2 mm, a small radius of 24 mm and a large radius of 25 mm. Thickness is approximately 3 mm and the initial length between jaws is 80 mm. In the Tables presented below, the percentage deformation at break between jaws is calculated from the movement of the tensile tester crosspiece and is thus based on the initial length between jaws of 80 mm. The width of the test specimen between the jaws is not constant so as to avoid breakage at the jaws, as a result of which this percentage deformation at break between jaws underestimates the true deformation at break of the narrower part of the test specimen. The value is nevertheless stated by way of comparison and should be interpreted as a minimum deformation at break value. In one of the Tables, a true deformation at break value is stated, which was measured for the same test specimen with an extensometer located in the constant width zone of said test specimen.

EXAMPLES

Example 1

KML 216, 141, 135, 135+roll mill, 219, 90, 176A

| Test reference | | KML 216 | KML 141 | KML 135 | KML 135 + roll mill |
|---|---|---|---|---|---|
| | | NR LA TZ latex | Intex 132 latex | SBR latex LX112 | LX 112 latex |
| | | N375 40 phr | N375 40 phr | N375 40 phr | N375 40 phr + roll mill |
| Viscosity [Pa * s] | 0.1 Hz | | 1.5E+06 | 1.1E+06 | 6.2E+05 |

-continued

| | | | | | |
|---|---|---|---|---|---|
| Vulcanization - (165° C. - 4.19%) | S' min [dNm] | | 6.2 | 4.36 | 2.8 |
| | S' max [dNm] | | 19.9 | 15.03 | 11.1 |
| Nonlinearity - (40° C. - 1.667 Hz) | Deformation (%) | | | | |
| | 0.7 G' (MPa) | | 8.33 | 8.13 | 4.20 |
| | 40 tan delta | | Not measurable | 0.29 | 0.24 |
| Modulus | ME10 (MPa) | | 14.3 | 9.39 | 4.61 |
| | ME100 (MPa) | | 2.75 | 2.08 | 1.64 |
| | ME300 (MPa) | | 1.87 | 1.57 | 2 |
| | ME300/ME100 | | 0.68 | 0.75 | 1.22 |
| | Set | | | | 60% |
| Limit properties | Breaking load (MPa) | | 14.8 | 18.0 | 22.4 |
| | Deformation at break between jaws (%) | | 321 | 419 | 343 |
| Notes | | Moulding problem | | | |
| Composition: | | | | | |
| NR LA TZ latex | | 100.00 | | | |
| SBR latex, Intex 132 | | | 100.00 | | |
| SBR latex LX112 | | | | 100.00 | 100.00 |
| N375 | | 40.00 | 40.00 | 40.00 | 40.00 |
| Active ZnO | | 2.50 | 2.50 | 2.50 | 2.50 |
| 2-Ethylhexanoic acid | | | 0.25 | 0.25 | 0.25 |
| 95% colloidal sulphur | | 1.50 | 1.50 | 1.50 | 1.50 |
| CBS | | 1.40 | 1.40 | 1.40 | 1.40 |
| KOH | | | 0.10 | 0.10 | 0.10 |
| Sodium dodecylbenzenesulphonate | | | 0.60 | 0.60 | 0.60 |
| Tamol | | 3.57 | 2.99 | 3.55 | 3.55 |
| Emulvin W | | 0.20 | 0.20 | 0.20 | 0.20 |
| CMC | | 0.05 | 0.16 | 0.10 | 0.10 |
| | | 149.22 | 149.70 | 150.20 | 150.20 |

This method, applied to formulations comprising 40 phr of N375, provides the results shown in the Table above. The formulations indicate the quantities (as dry weight) of surfactants required to produce the various dispersions of powder or to stabilize the latices expressed in phr. The results obtained with the formulation based on natural latex are not stated (KML216), because the excessively high viscosity of the mixture obtained meant that it could not be molded properly under the curing conditions stated above. With the SBR latex Intex 132, the results are average and scarcely better than those described in the prior art (KML141): very high ME10, very average breaking load, elevated set. Using SBR latex LX112 makes it possible to improve these results a little (KML 135): ME10 of the order of 9 MPa, breaking load close to 18 MPa, ME300/ME100 ratio of 0.75. These values are comparable with the results obtained with KML135 passed 4 times through the roll mill to work it mechanically (KML135+roll mill). In this case, ME10 is 4.6 MPa, G' 0.7% is only 4.2 MPa, the ME300/ME100 ratio has risen to 1.22 and breaking load is 22 MPa. These results, achieved with a sprayed mixture passed through a roll mill, are entirely representative of those which are achieved by producing materials of similar composition using the conventional process (internal mixer and roll mill).

| Test reference | | | KML 219 NR LA TZ latex Coupsil 40 phr | KML 90 Intex 132 latex Coupsil 40 phr | KML 176 A SBR latex LX112 Coupsil 40 phr |
|---|---|---|---|---|---|
| Viscosity [Pa * s] | 0.1 Hz | | | 1.4E+06 | 7.7E+05 |
| Vulcanization - (165° C. - 4.19%) | S' min [dNm] | | | 7 | 3.53 |
| | S' max [dNm] | | | 24.8 | 19 |
| Nonlinearity - (40° C. - 1.667 Hz) | Deformation (%) | | | | |
| | 0.7 G' (MPa) | | | 6.00 | 5.16 |
| | 40 tan delta | | | Not measurable | 0.27 |
| Modulus | ME10 (MPa) | | | 14.07 | 8.89 |
| | ME100 (MPa) | | | 3.06 | 2.07 |
| | ME300 (MPa) | | | 1.85 | 1.61 |
| | ME300/ME100 | | | 0.60 | 0.78 |
| | Set | | | | 40% |
| Limit properties | Breaking stress (MPa) | | | 16.0 | 18.2 |
| | Deformation at break between jaws (%) | | | 317 | 390 |
| Notes | | | | Moulding problem | |

-continued

| Composition: | | | |
|---|---|---|---|
| NR LA TZ latex | 100.00 | | |
| SBR latex, Intex 132 | | 100.00 | |
| SBR latex LX112 | | | 100.00 |
| Coupsil 8113 | 40.00 | 40.00 | 40.00 |
| Active ZnO | 2.50 | 2.50 | 2.50 |
| 2-Ethylhexanoic acid | | 0.25 | 0.25 |
| 95% colloidal sulphur | 1.50 | 1.50 | 1.50 |
| CBS | 1.40 | 1.40 | 1.40 |
| KOH | | 0.10 | 0.10 |
| Sodium dodecylbenzenesulphonate | | 0.60 | |
| Tamol | 3.57 | 4.68 | 3.79 |
| Emulvin W | 0.20 | 0.20 | 0.20 |
| CMC | 0.05 | 0.16 | 0.16 |
| | 149.22 | 151.39 | 149.90 |

The results are similar if the filler is silica. The viscosity of the mixture obtained with natural rubber is again too high (KML219). When SBR latex Intex 132 is used, the results are average and of the same level as those obtained with N375 (KML90): very high ME10, very average breaking load. Using SBR latex LX112 also makes it possible to improve these results a little (KML176A): ME10 of the order of 9 MPa, breaking load close to 18 MPa, set around 40%, ME300/ME100 ratio greater than 0.75.

Example 2

KML 221, 241/A, 224, 236, 243/D, 235/2C, 226, 227

This example demonstrates, for mixtures filled with carbon black, the value of using fillers which have previously undergone mechanical working.

| Test reference | | KML 221 LX 112 latex N375 40 phr | KML 241/A LX 112 latex N375 40 phr | KML 224 LX 112 latex N375 40 phr | KML 236 LX 112 latex N375 40 phr |
|---|---|---|---|---|---|
| Microfluidizer | No. of passes | 15 minutes | 10 | 10 | Filler: 10 Final susp.: 5 |
| | Pressure (bar) | 1500 | — | 1500 | 1500 |
| | Chamber 1 (type, diameter) | Z-200 microns | Convergent | Z-200 microns | Z-100 microns |
| | Chamber 2 (type, diameter) | Y-75 microns | (50 microns) | Y-75 microns | Y-75 microns |
| | | | (Angle 8°) | | |
| Dry grinding of filler | Duration (hours) | | 4 hrs | 16 hrs | |
| Viscosity [Pa * s] | 0.1 Hz | 8.1E+05 | 6.1E+05 | 5.2E+05 | 4.7E+05 |
| Vulcanization - (165° C. - 4.19%) | S' min [dNm] | 3.5 | 2.6 | 2.3 | 2.0 |
| | S' max [dNm] | 13.3 | 11.0 | 10.2 | 9.4 |
| Nonlinearity - (40° C. - 1.667 Hz) | Deformation (%) | | | | |
| | 0.7 G' (MPa) | 7.54 | 5.53 | 4.08 | 4.05 |
| | 40 tan delta | 0.33 | 0.29 | 0.29 | 0.28 |
| Modulus | ME10 (Mpa) | 8.49 | 7.03 | 5.97 | 5.40 |
| | ME100 (MPa) | 2.63 | 1.78 | 1.60 | 1.38 |
| | ME300 (MPa) | 2.29 | 1.63 | 1.28 | 1.30 |
| | ME300/ME100 | 0.87 | 0.92 | 0.80 | 0.94 |
| | Set | 47% | 42% | 42% | 42% |
| Limit properties | Breaking stress (MPa) | 17.4 | 22.7 | 21.8 | 21.6 |
| | Deformation at break between jaws (%) | 346 | 480 | 513 | 484 |
| Composition: | | | | | |
| SBR LX112 | | 100.00 | 100.00 | 100.00 | 100.00 |
| N375 | | 40.00 | 40.00 | 40.00 | 40.00 |
| 6PPD | | | 1.90 | | |
| Active ZnO | | 2.50 | 2.50 | 2.50 | 2.50 |
| 95% colloidal sulphur | | 1.50 | 1.50 | 1.50 | 1.50 |
| CBS | | 1.40 | 1.40 | 1.40 | 1.40 |
| CTP | | | 0.50 | | 0.50 |

-continued

|  |  |  |  |  |
|---|---|---|---|---|
| Tamol | 3.57 | 3.60 | 3.57 | 3.60 |
| Emulvin W | 0.20 | 0.20 | 0.20 | 0.20 |
| CMC | 0.05 | 0.07 | 0.05 | 0.07 |
|  | 149.22 | 151.67 | 149.22 | 149.77 |

The first method of mechanically working the filler involves using a homogenizer (M-110Y Microfluidizer, Microfluidics Corporation). This makes it possible to pass the filler dispersions or the final dispersion prior to spraying into small diameter chambers at very high speed under elevated pressure. The chambers can be of various geometries: Z or Y chambers of constant cross-section with diameters of 75, 100 and 200 microns, convergent chambers of 65 microns with an angle of 8°.

Passing the final dispersion through this apparatus only slightly reduces moduli at low deformation (G' 0.7% and ME10) (KML221). It does, however, ensure greater homogeneity of the dispersion to be sprayed. On the other hand, thorough treatment of the aqueous filler dispersion with this apparatus makes it possible to bring about a substantial reduction in the uncured viscosity of the mixture and in the moduli at low deformation (KML236). At the same time, breaking load has risen to higher than 21 MPa and the ME300/ME100 ratio is greater than 0.9.

A second method involves performing thorough dry grinding of the filler in a ball jar. For example, 300 grams of 9 mm diameter unglazed porcelain balls, 600 grams of 15 mm diameter balls, 600 grams of 20 mm diameter balls and 150 grams of carbon black or silica are placed in a 3 liter jar. The jar is set in rotation at a speed of approximately 40 revolutions/minute for a period ranging from 4 to 24 hours. Water and the necessary surfactants are then introduced and the jar is set in rotation for a further approximately 16 hours in order to obtain the aqueous filler dispersion.

This method may be used alone or combined with treatment of the final dispersion with the homogenizer. The results shown (KML241/A and 224) clearly demonstrate the value of extended dry grinding. In this case, viscosity has fallen to 5.2 $10^5$ Pa s, G' 0.7% is close to 4 MPa, ME10 is less than 6 MPa. Breaking loads are of the order of 22 MPa for both durations of dry grinding.

| Test reference | | KML 243/D LX 112 latex N375 40 phr | KML 238/A LX 112 latex N375 40 phr | KML 235/2C LX 112 latex N375 40 phr |
|---|---|---|---|---|
| Microfluidizer | No. of passes | | | |
|  | Pressure (bar) | | | |
|  | Chamber 1 (type, diameter) | | | |
|  | Chamber 2 (type, diameter) | | | |
| Premixing | | Addition of water | Addition of water | Addition of water |
|  | Proportion of dry LX112 relative to filler | 50% | 50% | 50% |
| Dry grinding of filler | Duration (hours) | | 4 hrs | 15 hrs |
| Viscosity [Pa * s] | 0.1 Hz | 7.4E+05 | 7.1E+05 | 5.0E+05 |
| Vulcanization - (165° C. - 1.667 Hz - 4.19%) | S' min [dNm] | 3.0 | 2.9 | 2.1 |
|  | S' max [dNm] | 12.1 | 11.4 | 10.5 |
| Nonlinearity - (40° C. - 1.667 Hz) | Deformation (%) | | | |
|  | 0.7 G' (MPa) | 6.53 | 5.83 | 4.25 |
|  | 40 tan delta | 0.30 | 0.29 | 0.28 |
| Modulus | ME10 (MPa) | 8.21 | 8.03 | 5.87 |
|  | ME100 (MPa) | 2.15 | 1.66 | 1.55 |
|  | ME300 (MPa) | 1.79 | 1.35 | 1.35 |
|  | ME300/ME100 | 0.83 | 0.81 | 0.87 |
|  | Set | 47% | 48% | 47% |
| Limit properties | Breaking stress (MPa) | 17.9 | 18.0 | 22.7 |
|  | Deformation at break between jaws (%) | 401 | 447 | 495 |
| Composition: | | | | |
| SBR LX112 | | 100.00 | 100.00 | 100.00 |
| N375 | | 40.00 | 40.00 | 40.00 |
| Active ZnO | | 2.50 | 2.50 | 2.50 |
| 95% colloidal sulphur | | 1.50 | 1.50 | 1.50 |
| CBS | | 1.40 | 1.40 | 1.40 |
| CTP | | 0.50 | 0.50 | 0.50 |
| Tamol | | 3.60 | 3.60 | 3.60 |
| Emulvin W | | 0.20 | 0.20 | 0.20 |
| CMC | | 0.07 | 0.07 | 0.07 |
|  | | 149.77 | 149.77 | 149.77 |

A third method, hereinafter designated premixing, has two variants: premixing without addition of water and premixing with addition of water. Premixing without addition of water proceeds as follows: the filler and a proportion of the latex of the formulation at a rate of 50% dry weight relative to the weight of the filler are placed in a jar filled with balls as described above. Grinding is carried out for three days. No surfactants are added at this stage. The inner surface of the jar is scraped each day. The aqueous solution of surfactant is then introduced and stirring is performed overnight. This latex-modified filler dispersion is then used in the same manner as described above.

This premixing method (KML 243/D, 238/A, 235/2C) also makes it possible to lower the viscosity of the sprayed mixture, to reduce moduli at low deformation and to improve the ME300/ME100 ratio and breaking loads. The effect is, however, all the more marked, the longer is the preceding dry grinding.

| Test reference | | | KML 226 | KML 227 |
|---|---|---|---|---|
| | | | LX 112 latex | LX 112 latex |
| | | | N375 40 phr | N375 40 phr |
| Microfluidizer | | No. of passes | Filler: 10 | Filler: 10 |
| | | | Final susp.: 4 | Final susp.: 4 |
| | | Pressure (bar) | 1500 | 1500 |
| | | Chamber 1 (type, diameter) | Z - 200 microns | Z - 200 microns |
| | | Chamber 2 (type, diameter) | Y - 75 microns | Y - 75 microns |
| Premixing | | | Addition of water | Addition of water |
| | | Proportion of dry LX112 relative to filler | 50% | 50% |
| Dry grinding of filler | | Duration (hours) | | 15 hrs |
| Viscosity [Pa * s] | | 0.1 Hz | 6.3E+05 | 5.1E+05 |
| Vulcanization - (165° C. - 4.19%) | | S' min [dNm] | 2.6 | 2.1 |
| | | S' max [dNm] | 11.5 | 9.5 |
| Nonlinearity - (40° C. - 1.667 Hz) | | Deformation (%) | | |
| | | 0.7 G' (MPa) | 5.99 | 4.00 |
| | | 40 tan delta | 0.30 | 0.28 |
| Modulus | | ME10 (MPa) | 7.46 | 6.10 |
| | | ME100 (MPa) | 1.90 | 1.80 |
| | | ME300 (MPa) | 1.96 | 1.66 |
| | | ME300/ME100 | 1.03 | 0.92 |
| | | Set | 45% | 41% |
| Limit properties | | Breaking stress (MPa) | 20.4 | 21.8 |
| | | Deformation at break between jaws (%) | 398 | 474 |
| Composition: | | | | |
| SBR LX112 | | | 100.00 | 100.00 |
| N375 | | | 40.00 | 40.00 |
| Active ZnO | | | 2.50 | 2.50 |
| 95% colloidal sulphur | | | 1.50 | 1.50 |
| CBS | | | 1.40 | 1.40 |
| CTP | | | | |
| Tamol | | | 3.57 | 3.57 |
| Emulvin W | | | 0.20 | 0.20 |
| CMC | | | 0.05 | 0.05 |
| | | | 149.22 | 149.22 |

These methods may also be combined. The combination of premixing with addition of water and passage of the filler dispersion through the homogenizer made it possible to achieve an ME300/ME100 ratio of 1.03 (KML226). These three methods may also be preceded by dry grinding (KML227).

Example 3

KML176A, 215C 293, 222, 181, 253, 275B

The full significance of what has been described above will be demonstrated by using a reinforcing filler of an entirely different nature, precipitated silica.

four hours makes it possible to reduce uncured viscosity, to minimize moduli at low deformation and bring about a distinct improvement in breaking load (KML215C).

As with the carbon black, passing the final solution through the Microfluidizer (KML293) alone makes it possible to reduce moduli at low deformation and to improve breaking load. However, the effect of passing the material through the homogenizer 7 times is less than that achieved by combining dry grinding with one passage of the final solution through the homogenizer (KML222). Moduli at low deformation are still lower, while the ME300/ME100 ratio has risen, as has breaking load.

| Test reference | | KML 176 A<br>LX 112 100 phr<br>Coupsil 40 phr | KML 215 C<br>LX 112 100 phr<br>Coupsil 40 phr | KML 293<br>LX 112 100 phr<br>Coupsil 40 phr | KML 222<br>LX 112 100 phr<br>Coupsil 40 phr |
|---|---|---|---|---|---|
| Microfluidizer | No. of passes | | | 7 | 20' minutes |
| | Pressure (bar) | | | 700 to 1000 | 500 to 1500 |
| | Chamber 1 (type, diameter) | | | Z - 200 microns | Z - 200 microns |
| | Chamber 2 (type, diameter) | | | Z - 100 microns | Y - 75 microns |
| Dry grinding of filler | Duration (hours) | | 4 hrs | | 4 hrs |
| Viscosity [Pa * s] | 0.1 Hz | 7.7E+05 | 6.20E+05 | 6.94E+06 | 6.00E+05 |
| Vulcanization - (165° C. - 4.19%) | S' min [dNm] | 3.5 | 3.03 | 3.30 | 2.93 |
| | S' max [dNm] | 19.0 | 16.61 | 17.42 | 16.30 |
| Nonlinearity - (40° C. - 1.667 Hz) | Deformation (%) | | | | |
| | 0.7 G' (MPa) | 5.16 | 4.46 | 4.60 | 4.29 |
| | 40 tan delta | 0.27 | 0.27 | 0.28 | 0.26 |
| Modulus | ME10 (MPa) | 8.89 | 7.00 | 7.38 | 6.80 |
| | ME100 (MPa) | 2.07 | 1.51 | 2.14 | 2.00 |
| | ME300 (MPa) | 1.61 | 1.32 | 1.69 | 1.73 |
| | ME300/ME100 | 0.78 | 0.87 | 0.79 | 0.87 |
| | Set | 40% | 52% | 42% | 37% |
| Limit properties | Breaking stress (MPa) | 18.2 | 21.5 | 20.4 | 21.6 |
| | Deformation at break between jaws (%) | 390 | 483 | 438 | 445 |
| Composition: | | | | | |
| SBR LX112 | | 100.00 | 100.00 | 100.00 | 100.00 |
| Coupsil 8113 | | 40.00 | 40.00 | 40.00 | 40.00 |
| 6PPD | | | | 1.90 | |
| Active ZnO | | 2.50 | 2.50 | 2.50 | 2.50 |
| 2-Ethylhexanoic acid | | 0.25 | | | |
| 95% colloidal sulphur | | 1.50 | 1.50 | 1.50 | 1.50 |
| CBS | | 1.40 | 1.40 | 1.40 | 1.40 |
| CTP | | | | 0.50 | |
| KOH | | 0.10 | | 1.30 | |
| Tamol | | 3.79 | 3.57 | 3.70 | 3.57 |
| Emulvin W | | 0.20 | 0.20 | 0.20 | 0.20 |
| CMC | | 0.16 | 0.05 | 0.07 | 0.05 |
| | | 149.90 | 149.22 | 153.07 | 149.22 |

The mixture obtained using the standard method of manufacture described in example 1 (KML176A) is also characterized by elevated rigidity at low deformation and an average breaking load of 18 MPa. Prior dry grinding of the silica for

| Test reference | | KML 181 | KML 253 | KML 275 B |
|---|---|---|---|---|
| | | LX 112 100 phr | LX 112 100 phr | LX 112 100 phr |
| | | Coupsil 40 phr | Coupsil 40 phr | Coupsil 40 phr |
| Microfluidizer | No. of passes | | | 5 |
| | Pressure (bar) | | | 1000 |
| | Chamber 1 (type, diameter) | | | Z - 200 microns |
| | Chamber 2 (type, diameter) | | | Y - 75 microns |
| Premixing | | Without addition of water | With addition of water | With addition of water |
| | Proportion of dry LX112 relative to filler | 0.50 | 0.50 | 0.50 |
| Dry grinding of filler | Duration (hours) | | 4 hrs | 4 hrs |
| Viscosity [Pa * s] | 0.1 Hz | 6.86E+05 | 3.58E+05 | 5.36E+05 |
| Vulcanization - (165° C. - 4.19%) | S' min [dNm] | 3.00 | 1.91 | 2.61 |
| | S' max [dNm] | 14.82 | 11.29 | 15.99 |
| Nonlinearity - (40° C. - 1.667 Hz) | Deformation (%) | | | |
| | 0.7 G' (MPa) | 4.10 | 2.42 | 4.27 |
| | 40 tan delta | 0.27 | 0.23 | 0.29 |
| Modulus | ME10 (MPa) | 7.12 | 5.48 | 6.76 |
| | ME100 (MPa) | 1.58 | 1.67 | 1.59 |
| | ME300 (MPa) | 1.21 | 1.33 | 1.33 |
| | ME300/ME100 | 0.77 | 0.80 | 0.84 |
| | Set | 44% | 34% | 40% |
| Limit properties | Breaking stress (MPa) | 20.0 | 18.9 | 23.6 |
| | Deformation at break between jaws (%) | 507 | 481 | 517 |
| Composition: | | | | |
| SBR | | 100.00 | 100.00 | 100.00 |
| LX112 | | | | |
| Coupsil 8113 | | 40.00 | 40.00 | 40.00 |
| 6PPD | | | 1.90 | |
| Active ZnO | | 2.50 | 2.50 | 2.50 |
| 2-Ethylhexanoic acid | | 0.25 | | |
| 95% colloidal sulphur | | 1.50 | 1.50 | 1.50 |
| CBS | | 1.40 | 1.40 | 1.40 |
| CTP | | | 0.50 | 0.50 |
| KOH | | 0.10 | | |
| Tamol | | 3.79 | 3.60 | 3.60 |
| Emulvin W | | 0.20 | 0.20 | 0.20 |
| CMC | | 0.16 | 0.07 | 0.07 |
| | | 149.90 | 151.67 | 149.77 |

Premixing with or without addition of water can also be applied when silica is used as filler. Premixing with addition of water involves, after optional dry grinding of variable duration, introducing the aqueous surfactant solution into the jar and stirring for 6 to 12 hours. A proportion of the latex of the formulation at a rate of 50% dry weight relative to the weight of the filler is then introduced and the jar is set in rotation for 12 to 20 hours. This latex-modified filler dispersion is then used in the same manner as described above. The reduction in moduli at low deformation is greatest when dry grinding is combined with premixing (KML181, 253). In this case, set is also reduced.

It is also possible to combine the 3 methods, dry grinding, premixing with addition of water and passage through the homogenizer (KML275B). Apart from a reduction in moduli at low deformation and an increase in the ME300/ME100 ratio, a very high breaking load of more than 23 MPa is observed in this case.

Example 4

KML464, 465, T10179, 492

In addition to these methods which make it possible to work the fillers mechanically, selection of the type of latex is also very important.

| Test reference | | KML 464 | KML 465 |
|---|---|---|---|
| | | SBR latex | SBR latex |
| | | LX112 | LX110 |
| | | Coupsil 40 phr | Coupsil 40 phr |
| | | Aromatic oil 15 phr | Aromatic oil 15 phr |
| Microfluidizer | No. of passes | 4 | 4 |
| | Pressure (bar) | 500 | 500 |

|  |  |  |  |
|---|---|---|---|
|  | Chamber 1 (type, diameter) | Z - 200 microns | Z - 200 microns |
|  | Chamber 2 (type, diameter) | Z - 100 microns | Z - 100 microns |
| Dry grinding of the filler, duration (hours) |  | 4 hrs | 4 hrs |
| Viscosity [Pa * s] | 0.1 Hz | 3.7E+05 | 1.2E+06 |
| Vulcanization - (165° C. - 1.667 Hz - 4.19%) | S' min [dNm] | 1.72 | 6.07 |
|  | S' max [dNm] | 9.92 | 15.89 |
| Nonlinearity - (40° C. - 1.667 Hz) | Deformation (%) |  |  |
|  | 0.7 G' (MPa) | 2.68 | 2.43 |
|  | 40 tan delta | 0.29 | 0.12 |
| Modulus | ME10 (MPa) | 3.78 | 5.2 |
|  | ME100 (MPa) | 1.10 | 1.52 |
|  | ME300 (MPa) | 0.88 | 1.07 |
|  | ME300/ME100 | 0.80 | 0.70 |
|  | Set | 43% | 25% |
| Limit property | Breaking stress (MPa) | 14.2 | 19.0 |
|  | Deformation at break between jaws (%) | 569 | 554 |
|  | True deformation at break (%) with extensometer |  |  |
| Abrasion | (20 N - 40 m) |  |  |
| Composition: |  |  |  |
| SBR1500 |  |  |  |
| SBR LX112 |  | 100.00 |  |
| SBR LX110 |  |  | 100.00 |
| Coupsil 8113 |  | 40.00 | 40.00 |
| Aromatic oil |  | 14.30 | 14.30 |
| 6PPD |  |  |  |
| Active ZnO |  | 2.50 | 2.50 |
| Stearic acid |  |  |  |
| 95% colloidal sulphur |  | 1.50 | 1.50 |
| CBS |  | 1.40 | 1.40 |
| DPG |  |  |  |
| CTP |  | 0.50 | 0.50 |
| KOH |  | 1.20 | 1.20 |
| Na dodecylsulphonate |  | 0.45 | 0.45 |
| Na dodecylsulphate |  | 0.25 | 0.25 |
| Tamol |  | 3.60 | 3.60 |
| CMC |  | 0.07 | 0.07 |
|  |  | 165.77 | 165.77 |

A formulation was prepared with latex LX112, 40 phr of Coupsil and 15 phr of oil (KML 464). Aromatic oil can be introduced into these dispersions by preparing an aqueous dispersion of the oil at a concentration of 40% using surfactants such as sodium dodecylsulphonate and sodium dodecylsulphate. Due to the addition of oil, the uncured viscosity and moduli at low deformation are normally reduced relative to the results of example 3. Replacing latex LX112 with latex L110 provides very interesting results (KML465). A very large reduction in set and tangent delta, the hysteresis loss factor and indicator of heating of the mixture during use, is observed.

|  |  |  | T10179 | KML 492 |
|---|---|---|---|---|
|  |  |  |  | LX 110/112 50/50 |
|  |  |  | Mixing 2 phases, int. mixer + roll mill | Coupsil 8113 40 phr |
| Microfluidizer | No. of passes |  |  | 4 |
|  | Pressure (bar) |  |  | 500 |
|  | Chamber 1 (type, diameter) |  |  | Z - 200 microns |
|  | Chamber 2 (type, diameter) |  |  | Z - 100 microns |
| Dry grinding of the filler, duration (hours) |  |  |  | 4 hrs |
| Viscosity [Pa * s] | 0.1 Hz |  | 3.3E+05 | 7.8E+05 |
| Vulcanization - (165° C. - 1.667 Hz - 4.19%) | S' min [dNm] |  | 1.63 | 4.04 |
|  | S' max [dNm] |  | 11.84 | 16.08 |
| Nonlinearity - (40° C. - 1.667 Hz) | Deformation (%) |  |  |  |
|  | 0.7 G' (MPa) |  | 1.91 | 2.90 |
|  | 40 tan delta |  | 0.13 | 0.16 |
| Modulus | Shore hardness |  | 65 | 68 |
|  | ME10 (MPa) |  | 4.18 | 5.33 |
|  | ME100 (MPa) |  | 1.78 | 1.60 |
|  | ME300 (MPa) |  | 2.14 | 1.36 |
|  | ME300/ME100 |  | 1.20 | 0.85 |
|  | Set |  | 25% | 24% |

| | -continued | | |
|---|---|---|---|
| Limit property | Breaking stress (MPa) | 20.8 | 20.8 |
| | Deformation at break between jaws (%) | 375 | 474 |
| | True deformation at break (%) with extensometer | 447 | 646 |
| Abrasion | (20 N - 40 m) | 100 | 98 |
| Composition: | | | |
| SBR1500 | | 100.00 | |
| SBR LX112 | | | 50.00 |
| SBR LX110 | | | 50.00 |
| Coupsil 8113 | | 40.00 | 40.00 |
| Aromatic oil | | | |
| 6PPD | | 1.00 | |
| Active ZnO | | 2.50 | 2.50 |
| Stearic acid | | 1.00 | |
| 95% colloidal sulphur | | 1.50 | 1.50 |
| CBS | | 2.00 | 2.00 |
| DPG | | 1.00 | 1.00 |
| CTP | | 0.50 | 0.50 |
| KOH | | | 1.20 |
| Na dodecylsulphonate | | | |
| Na dodecylsulphate | | | |
| Tamol | | | 3.63 |
| CMC | | | 0.07 |
| | | 149.50 | 152.40 |

A mixture based on SBR1500, an emulsion SBR similar to the polymer constituting latex LX112, and 40 phr of Coupsil silica was produced in an internal mixer in two phases (T10179). The results reveal an ME10 of 4.2 MPa, a tangent delta of 0.13, an ME300/ME100 ratio of 1.2, a set of 25%, a breaking load of approximately 21 MPa for a true elongation measured by extensometer of approximately 450%. The abrasion resistance of this material was measured with a Bareiss abnfe05000 abrasimeter in accordance with Standard DIN53416; the revolving specimen method was used and a force of 20 N was applied with the test piece with a friction track 40 m in length. The displayed abrasion resistance was standardized to 100.

Figure 1:
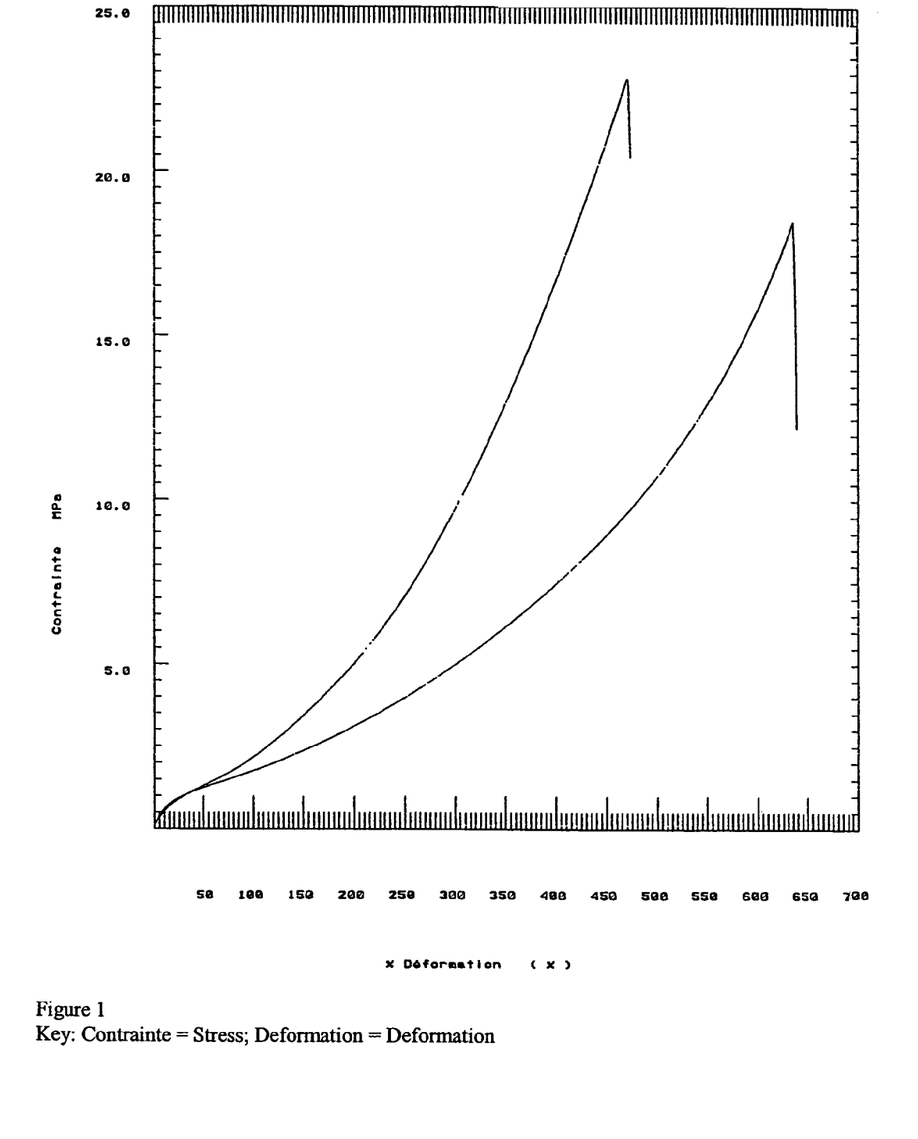
FIG. 1 shows the stress-deformation curves of a reference composition and a composition according to the invention.

The same formulation was produced as described above (KML492) using a combination of dry grinding and the homogenizer. A 50:50 blend of LX112 and LX110 was used. LX110 alone would have yielded a mixture with a very high uncured viscosity such as not to permit proper molding. In comparison with the mixture produced in the internal mixer, identical set and abrasion resistance results were obtained. Breaking load is only slightly lower, while the moduli at low deformation and tangent delta are slightly higher. The ME300/ME100 ratio, although 0.85, is nevertheless lower and elongation at break is higher. The stress-deformation curves shown in FIG. 1 correspond, in the case of that having a true elongation break of 450%, to the conventionally produced mixture T10179 and, in the case of that having an elongation at break of 640%, to the sprayed mixture KML492. This Figure clearly shows that, up to approximately 50% deformation, the curve for the sprayed mixture can be superimposed on the curve for the conventionally produced mixture of the same formulation.

A comparison of these results with those for the first mixture of example 3 (KML176A) clearly reveals the value of the methods which allow mechanical working of the fillers and of the appropriate selection of the type of latex. When these results are compared this time with the sixth mixture of example 1 (KML90), it may be concluded that the positive effects observed with LX110 are due more to the small size of the latex particles than to the elevated viscosity thereof.

Example 5

KML396, 483, 187

These sprayed mixture methods make it possible to use all the ingredients required for the formulation, as it is likewise possible for mixtures produced in an internal mixer.

| Test reference | | | KML 396 | KML 483 | KML 187 |
|---|---|---|---|---|---|
| | | | LX 112 100 phr | LX 112 100 phr | LX 112 100 phr |
| | | | Coupsil 40 phr | Coupsil 40 phr | Coupsil 40 phr |
| Microfluidizer | | No. of passes | 3 | 4 | |
| | | Pressure (bar) | 500 | 500 | |
| | | Chamber 1 (type, diameter) | Z - 200 microns | Z - 200 microns | |
| | | Chamber 2 (type, diameter) | Z - 100 microns | Z - 100 microns | |
| Premixing | | | with addition of water | | without addition of water |
| | | Proportion of dry LX112 Relative to filler | 50% | | 50% |
| Dry grinding of filler | | Duration (hours) | | 4 hrs +4 hrs with AO and DPG | 24 hrs |

-continued

| | | | | |
|---|---|---|---|---|
| Viscosity [Pa * s] | 0.1 Hz | 5.07E+05 | 4.36E+05 | 4.35E+05 |
| Vulcanization - (165° C. - 4.19%) | S' min [dNm] | 2.83 | 2.35 | 2.18 |
| | S' max [dNm] | 15.66 | 13.97 | 11.40 |
| Nonlinearity - (40° C. - 1.667 Hz) | Deformation (%) | | | |
| | 0.7 G' (MPa) | 2.88 | 3.23 | 2.43 |
| | 40 tan delta | 0.22 | 0.26 | 0.25 |
| Modulus | ME10 (MPa) | 6.87 | 5.01 | 5.69 |
| | ME100 (MPa) | 2.03 | 1.75 | 1.73 |
| | ME300 (MPa) | 1.60 | 1.50 | 1.45 |
| | ME300/ME100 | 0.79 | 0.86 | 0.84 |
| | Set | 41% | 40% | 36% |
| Limit property | Breaking stress (MPa) | 25.4 | 19.9 | 20.4 |
| | Deformation at break between jaws (%) | 539 | 487 | 455 |
| Composition: | | | | |
| SBR LX112 | | P100.00 | 100.00 | 100.00 |
| Coupsil 8113 | | 40.00 | 40.00 | 40.00 |
| 6PPD | | 1.90 | 1.90 | |
| Ozone wax | | 1.50 | 1.50 | |
| Active ZnO | | 2.50 | 2.50 | 2.50 |
| Stearic acid | | | | 0.25 |
| 95% colloidal sulphur | | 1.50 | 1.50 | 1.50 |
| CBS | | 1.40 | 1.40 | 1.40 |
| DPG | | 1.50 | 1.00 | |
| CTP | | 0.50 | 0.70 | |
| KOH | | 1.70 | 1.50 | 0.10 |
| Tamol | | 3.52 | 1.77 | 0.21 |
| Emulvin W | | | | 0.20 |
| CMC | | 0.07 | 0.05 | 0.16 |
| | | 156.09 | 153.82 | 146.32 |

The three examples show that it is possible to introduce an antioxidant such as 6PPD, a static antiozonant such as an ozone wax, stearic acid as vulcanization activator, DPG as secondary accelerator and CTP as vulcanization retarder. They also show that it is possible to reduce the quantity of dispersant which is required. The third mixture contains only 0.57 phr of surfactant in the dry formulation.

Example 6

KML469, 484

| | | KML 469 | KML 484 |
|---|---|---|---|
| Test reference | | LX 110/112 75/25 Coupsil 8113 40 phr Aromatic oil 20 phr | LX 110/112 75/25 Coupsil 8113 60 phr Aromatic oil 50 phr |
| Microfluidizer | No. of passes | 4 | 4 |
| | Pressure (bar) | 500 | 500 |
| | Chamber 1 (type, diameter) | Z - 200 microns | Z - 200 microns |
| | Chamber 2 (type, diameter) | Z - 100 microns | Z - 100 microns |
| Dry grinding of filler | Duration (hours) | 4 hrs | 4 hrs +4 hrs with oil |
| Viscosity [Pa * s] | 0.1 Hz | 8.67E+05 | 1.10E+06 |
| Vulcanization - (165° C. - 4.19%) | S' min [dNm] | 4.29 | 5.41 |
| | S' max [dNm] | 12.75 | 16.50 |
| Nonlinearity - (40° C. - 1.667 Hz) | Deformation (%) | | |
| | 0.7 G' (MPa) | 2.11 | 4.13 |
| | 40 tan delta | 0.15 | 0.18 |
| Modulus | Shore hardness | 61 | 69 |
| | ME10 (MPa) | 4.50 | 6.36 |
| | ME100 (MPa) | 1.21 | 1.57 |
| | ME300 (MPa) | 0.85 | 1.13 |
| | ME300/ME100 | 0.70 | 0.72 |
| | Set | 25% | 39% |

-continued

| Limit property | | | |
|---|---|---|---|
| | Breaking stress (MPa) | 21.8 | 18.4 |
| | Deformation at break between jaws (%) | 656 | 512 |
| Composition: | | | |
| SBR LX112 | | 25.00 | 25.00 |
| SBR LX110 | | 75.00 | 75.00 |
| Coupsil 8113 | | 40.00 | 67.64 |
| Aromatic oil | | 19.05 | 50.00 |
| Active ZnO | | 2.50 | 2.50 |
| 95% colloidal sulphur | | 1.50 | 1.50 |
| CBS | | 1.40 | 2.50 |
| DPG | | | 1.00 |
| CTP | | 0.50 | 0.50 |
| KOH | | 1.20 | 1.20 |
| Na dodecylsulphonate | | 0.60 | |
| Na dodecylsulphate | | 0.35 | |
| Tamol | | 3.60 | 5.98 |
| CMC | | 0.07 | 0.07 |
| | | 170.77 | 232.90 |

These two examples also show that it is possible to formulate these mixtures with varying filler and oil contents, as is the case with conventionally produced mixtures. In the first example, the oil is introduced as an emulsion of a concentration of 40%. In the second, the oil is introduced into the ground silica with several hours' additional grinding to disperse the oil on the filler.

One method which is ideally suited to obtaining the mixtures described by the invention consists in spraying the final dispersion into hot air. In this case, a cone equipped with a filter is generally use to promote recovery of the product.

The final dispersion may also be sprayed directly onto a form or into a mould using spraying air which is sufficiently hot largely to dry the product before it is deposited on the form. Using a rotating form substantially having the shape of the internal cavity of the tire is particularly well suited to the production of tires.

For example, by using a spray gun equipped with two different tanks each containing a final dispersion of different composition and a mixing valve, it is a simple matter to change over gradually from a mixture of one nature to a mixture of another nature. This has the advantage that it is possible to produce solid articles without a distinct interface between the different constituent mixtures thereof.

It has been seen that subjecting a filler to mechanical working before mixing it with a latex can result in an improved reinforcing action. It has been seen that the prior mechanical working undergone by the filler may be achieved by grinding the filler and a proportion of the latex of the formulation together for a certain amount of time, then introducing the aqueous surfactant solution and mixing in order to obtain a dispersion of the filler. For example, the latex then introduced into the final dispersion may be of the same nature or of a different nature. It has also been seen that the prior mechanical working undergone by the filler may be achieved by dispersing the filler in an aqueous surfactant solution, introducing a proportion of the latex of the formulation and then mixing for a certain time in order to obtain a homogeneous dispersion of the filler. Similarly, the latex then introduced into the final dispersion may be of the same nature or of a different nature.

The final latex dispersion produced according to one or the other of the variants described above may be used in many different applications in the rubber industry:

Production of elastomeric materials for tire-making.

Production of elastomeric adhesives reinforced by the presence of the filler.

Production of resorcinol-formol-latex ("RFL") adhesive intended for bonding rubber mixtures to textile reinforcement such as for example rayon, nylon, polyester, aramid or glass fiber. The aqueous dispersion is particularly well suited to methods for applying these adhesives using impregnating baths.

Production of a mixture which adheres to metal. Impregnation of metal cords with the aqueous dispersion makes it possible to impregnate the core of the cord.

Use instead of mixture solutions to improve uncured adhesion during assembly of the various products of a rubber article during manufacture. The final dispersion is applied as a thin layer, for example by spraying or brushing.

In tire recapping for producing the bonding mixture used to adhere the uncured mixture part to the old part or the precured mixtures to the old part of the tire to be recapped.

Direct production of a tread by spraying of a ad hoc composition onto a rotating tire carcass.

The premixing variants with or without addition of water make it possible to produce polymer associations for which the nature of the polymer preferably in contact with the filler is selected. Said variants also make it possible, when producing the final dispersion, to produce associations of fillers of a different nature for which it is possible to select the nature of the polymer preferably in contact with each of the fillers.

What is claimed is:

1. A process for obtaining a vulcanized elastomer composition comprising the steps of:
   producing an aqueous dispersion comprising an elastomer latex having a small particle size, a filler having undergone a mechanical working stage, and conventional vulcanization ingredients;
   drying said aqueous dispersion; and
   vulcanizing directly in a mould at a pressure of greater than 15 bar,
   wherein the mechanical working undergone by the filler is performed in the presence of the elastomer latex and surfactants.

2. The process according to claim 1, wherein the mechanical working undergone by the filler is performed by passing a filler dispersion at least once at high pressure into small diameter chambers of a homogenizer.

3. The process according to claim 1, wherein the mechanical working undergone by the filler is performed by grinding the filler and a proportion of the elastomer latex together for a certain amount of time, then introducing an aqueous surfactant solution and mixing in order to obtain a dispersion of the filler.

4. The process according to claim 1, wherein the mechanical working undergone by the filler is performed by dispersing the filler in an aqueous surfactant solution, introducing a proportion of the elastomer latex, and then mixing for a certain time.

5. The process according to claim 1, further comprising shaping the aqueous dispersion, and wherein the drying and shaping are achieved by spraying of the aqueous dispersion in hot air.

6. The process according to claim 5, wherein the drying and shaping are achieved by spraying of the aqueous dispersion in hot air with direct deposition onto a form, so subsequently permitting the vulcanization under pressure.

7. The process according to claim 1, wherein the vulcanization is performed at a pressure of greater than 50 bar.

8. A final latex dispersion obtained by a process comprising the steps of:
   1) producing an aqueous dispersion comprising an elastomer latex having a small particle size, a filler having undergone a mechanical working stage, and conventional vulcanization ingredients; and
   2) drying said aqueous dispersion,
wherein the mechanical working undergone by the filler is performed in the presence of the elastomer matrix and surfactants; and
wherein the final latex dispersion is applied to a metallic cord.

9. A final latex dispersion obtained by a process comprising the steps of:
   1) producing an aqueous dispersion comprising an elastomer latex having a small particle size, a filler having undergone a mechanical working stage, and conventional vulcanization ingredients; and
   2) drying said aqueous dispersion,
wherein the mechanical working undergone by the filler is performed in the presence of the elastomer matrix and surfactants; and
wherein the final latex dispersion is applied as a thin layer between the various products of a tire during manufacture.

10. A final latex dispersion obtained by a process comprising the steps of:
   1) producing an aqueous dispersion comprising an elastomer latex having a small particle size, a filler having undergone a mechanical working stage, and conventional vulcanization ingredients; and
   2) drying said aqueous dispersion,
wherein the mechanical working undergone by the filler is performed in the presence of the elastomer matrix and surfactants; and
wherein the final latex dispersion is an adhesive and is used during recapping between an old part and a new uncured part or between the old part and a new, precured part.

11. A final latex dispersion obtained by a process comprising the steps of:
   1) producing an aqueous dispersion comprising an elastomer latex having a small particle size, a filler having undergone a mechanical working stage, and conventional vulcanization ingredients; and
   2) drying said aqueous dispersion,
wherein the mechanical working undergone by the filler is performed in the presence of the elastomer matrix and surfactants; and
wherein the final latex dispersion is used for direct production of a tread by spraying of an ad hoc composition onto a rotating tire carcass.

12. The process according to claim 1, wherein the elastomer in the elastomer matrix is chosen from NR and SBR elastomers.

13. The process according to claim 1, wherein the filler is present in an amount of at least 35 phr.

14. The process according to claim 1, wherein the small particle size is less than or equal to 115 nm.

15. The process according to claim 1, wherein the small particle size is less than or equal to 65 nm.

* * * * *